United States Patent

[11] 3,622,341

| [72] | Inventor | Wndell Maurice Lee |
| | | Trenton, N.J. |
| [21] | Appl. No. | 846,942 |
| [22] | Filed | Aug. 1, 1969 |
| [45] | Patented | Nov. 23, 1971 |
| [73] | Assignee | RCA Corporation |

[54] ZINC OXIDE AND TITANIUM OXIDE SENSITIZED BY AZO DYES
5 Claims, No Drawings

[52] U.S. Cl.......................................................... 96/1.6, 96/1.7
[51] Int. Cl........................................................ G03g 5/02, G03g 5/08
[50] Field of Search............................................ 96/1.5–1.8

[56] References Cited
UNITED STATES PATENTS

| 3,069,365 | 12/1962 | Shely | 96/1.7 X |
| 3,152,903 | 10/1964 | Sheparo et al. | 96/1.6 X |
| 3,155,503 | 11/1964 | Cassiers et al. | 96/1.5 |
| 3,245,786 | 4/1966 | Cassiers et al. | 96/1.7 X |

FOREIGN PATENTS

| 628,437 | 8/1963 | Belgium | 96/1.7 |

*Primary Examiner*—Donald Levy
*Assistant Examiner*—R. E. Martin
*Attorney*—Glenn H. Bruestle ABSTRACT: A spectrally sensitized electrophotographic recording element includes a photoconductive layer that comprises a zinc oxide and/or titanium dioxide photoconductor in a film-forming resin and a small quantity of at least one azo dye that has either an o,o'-dihydroxy or an o-amino-o'-hydroxy azo structure.

ZINC OXIDE AND TITANIUM OXIDE SENSITIZED BY AZO DYES

BACKGROUND OF INVENTION

This invention relates generally to spectrally sensitized electrophotographic materials, and more particularly to novel dye-sensitized electrophotographic materials. The novel dye-sensitized electrophotographic materials are particularly applicable to use as recording elements in electrophotographic processes.

The photoconductivity of certain electrophotographic materials, such as photoconductive zinc oxide, for example, is not responsive to, that is, not affected by, all wavelengths of light in the visible spectrum. It has been proposed to sensitize these materials to light in the visible spectrum by treating them with a small quantity of one or more specially selected dyes. Many dyes have been discovered which spectrally sensitized electrophotographic materials, but some of these dyes are relatively expensive and/or are not easily incorporated into the products they are intended to dye-sensitize.

Although azo dyes make up the largest class of synthetic chemical dyes, are very readily obtainable commercially, are relatively inexpensive, and provide the fullest shade range of any class of dyes, they have not been used to sensitize electrophotographic materials. Most azo dyes are not suitable for this purpose, but I have found that azo dyes with certain structures, however, provide photographic materials with a good response to light in the visible spectrum.

SUMMARY OF INVENTION

Briefly stated, the novel spectrally sensitized light-sensitive materials comprise a photoconductor and at least one azo dye that has either an o,o'-dihydroxy or an o-amino-o'-hydroxy azo structure.

DESCRIPTION OF THE PREFERRED EMBODIMENTS

The novel spectrally sensitized electrophotographic materials comprise a photoconductor, such as photoconductive zinc oxide or photoconductive titanium dioxide, for example, commonly used in electrophotographic recording elements, and at least one azo dye having, as part of its formula, the structure $$\begin{matrix} \text{OH} & & & \text{X} \\ | & & & | \\ -\text{C}=\text{C}-\text{N}=\text{N}-\text{C}=\text{C}- \\ | & & & | \end{matrix}$$

wherein X represents a -OH or a -NH$_2$ group, and the structure —NP=N— is a chromophore connecting two carbon systems, at least one of which is aromatic. it has been found that azo dyes having o,o'-dihydroxy or o-amino-o'-hydroxy azo structures spectrally sensitize electrophotographic materials in the visible spectrum. These azo dyes are usually added to photoconductive layers, comprising a photoconductor in a film-forming resin, as unmetalized dyes or as premetalized azo to show the spectral sensitization effect in electrophotographic materials.

Azo dyes, having the aforementioned suitable structure for spectrally sensitizing electrophotographic materials, are quite numerous and can exist in many different colors. This large group of azo dyes enables one to select one or more suitable dyes to render an electro-photographic material responsive to light in either a narrow or a wide range of wavelengths. For example, if an electrophotographic recording element is to be responsive to light produced by tungsten filaments, the photoconductive layer should be sensitized to be responsive to orange and red light. On the other hand, if the recording element is to be responsive to blue light, as from a light-emitting phosphor of a cathode-ray tube, the recording element should be sensitized to be responsive to light in this range of wavelengths. Thus, because of the wide range of dyes available in the azo class of dyes, it is possible to spectrally sensitize electrophotographic recording elements easily and inexpensively to light in the visible spectrum.

Table I (listed below) contains a list of 12 examples of azo dyes of the type suitable for spectrally sensitizing electrophotographic materials. In each example, the azo dye is given by formula, as derived from its diazo component and it s coupling component (listed below each formula). Each of the azo dyes is identified by its (Color Index) C.I. number, and its (Color Index) C.I. name, as listed in Color Index, Volume 3, by The Society of Dyes and Colorists, and The American Association of Textile Chemists and Colorists. The commmerical names of the dyes and their commercial suppliers are also given. The region of the spectral sensitivity produced in a photoconductive layer, containing zinc oxide in a film-forming resin, by each of the listed dyes is given by color, as determined by light passed through Wratten Filters 2B (3,900->7,000 A., visible spectrum), 47B (4,000–5,000 A., blue), 58 (4,800–6,000 A., green), and R 25A (5,800->7,000 A., red). dye complexes wherein the complexing metal is the same as that in the photoconductor. Thus, where the photoconductor is zinc oxide, the premetalized azo dye would be a zinc azo dye complex.

The azo dyes used for spectral sensitization usually do not significantly color the electrophotographic material because they are added to the material in relatively small quantities, the largest quantity being about 0.5 percent by weight with respect to the weight of the photoconductor of the electrophotographic material.

The azo dyes listed in Table I, below are particularly suited for the spectral sensitization of electrophotographic materials including photoconductive zinc oxide and titanium dioxide. These azo dyes are listed as sodium salts (except No. 11) and are not premetalized. It is important to note, however, that metal complexes of the azo dyes, that are suitable in their unmetalized state for the spectral sensitization of electrophotographic materials and other than the azo dye complexes of metals that are the same as those in the photoconductor, fail

TABLE I

| Number | Azo dye formula as derived from: Diazo component→coupling component | 1. C.I. number<br>2. C.I. name<br>3. Commercial name<br>4. Supplier | Region of spectral sensitivity |
|---|---|---|---|
| 1 | 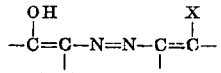<br>1-amino-6-nitro-2-naphthol-4-sulfonic acid→1-naphthol | 1. C.I. 14645.<br>2. C.I. Mordant Black II.<br>3. Erio Chrome Black T Supra.<br>4. (1) and (2). | Green and red. |
| 2 | 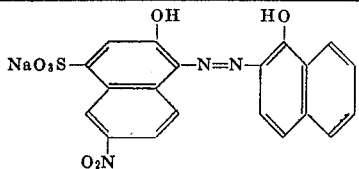<br>1-amino-2-naphthol-4-sulfonic acid→1-naphthol | 1. C.I. 14640.<br>2. C.I. Mordant Black 3.<br>3. Erio Chrome Blue Black BC.<br>4. (1). | Green and red. |

TABLE I—Continued

| Number | Azo dye formula as derived from: Diazo component→coupling component | 1. C.I. number<br>2. C.I. name<br>3. Commercial name<br>4. Supplier | Region of spectral sensitivity |
|---|---|---|---|
| 3 | [structure]<br>2-amino-4-nitrophenol→2,4-diamino-benzenesulfonic acid | 1. C. I. 13250.<br>2. C. I. Mordant Brown 33.<br>3. Erio Chrome Brown R Supra.<br>4. (1). | Green. |
| 4 | [structure]<br>2-amino-1-phenol-4-sulfonic acid→resorcinol | 1. C. I. 14290.<br>2. C. I. Mordant Red 5.<br>3. Erio Chrome Garnet L. 200%.<br>4. (1). | Green. |
| 5 | [structure]<br>5-amino-6-hydroxy-m-toluene sulfonic acid→<br>3-methyl-1-phenyl-5-pyrazolone | 1. C. I. 18750.<br>2. C. I. Mordant Red 17.<br>3. Erio Chrome Red G Supra.<br>4. (1). | Green. |
| 6 | [structure]<br>1-amino-2-naphthol-4-sulfonic acid→2-naphthol | 1. C. I. 15705.<br>2. C. I. Mordant Black 17.<br>3. Erio Chrome Blue Black Supra.<br>4. (1). | Green and red. |
| 7 | [structure]<br>6-amino-4-nitro-1-phenol-2-sulfonic acid → 1-(m-chlorophenyl)-3-methyl-5-pyrazolone | 1. C.I. 18940.<br>2. C.I. Mordant Orange 4.<br>3. Chrome Fast Orange 3RLA.<br>4. (3). | Blue and green. |
| 8 | [structure]<br>2-amino-1-phenol-4-sulfonic acid → m-phenylenediamine. | 1. C.I. 13225.<br>2. C.I. Mordant Brown 13.<br>3. Alizarol Brown 2R.<br>4. (4). | Blue and green. |
| 9 | [structure]<br>6-amino-4-chloro-1-phenol-2-sulfonic acid → 1-Naphthol-5-sulfonic acid | 1. C.I. 14855.<br>2. C.I. Mordant Blue 9.<br>3. Diamond Fast Dark Blue RRL D/L.<br>4. (5). | Green. |
| 10 | [structure]<br>2-amino-3,4,6-trichlorophenol → N-acetyl S acid | 1. C.I. 17940.<br>2. C.I. Mordant Blue 7.<br>3. Diamond Chrome Brilliant Blue BL.<br>4. (5). | Green and red. |

TABLE I—Continued

| Number | Azo dye formula as derived from: Diazo component→coupling component | 1. C.I. number<br>2. C.I. name<br>3. Commercial name<br>4. Supplier | Region of spectral sensitivity |
|---|---|---|---|
| 11 | $O_2N$ — OH  HO —N=N— NH·CO·CH$_3$ ; $O_2N$<br>Picramic acid → p-hydroxyacetanilide | 1. C.I. 11835.<br>2. C.I. Mordant Green 2.<br>3. Diamond Chrome Olive GG.<br>4. (5). | Green and red. |
| 12 | $NaO_3S$ — OH   HO—C—CH$_3$   —N=N—C—C—N—   O  H ; $O_2N$<br>6-amino-4-itro-1-phenol-2-sulfonic acid→ acetoacetanilide | 1. C.I. 13900.*<br>2. C.I. Acid Yellow 99.<br>3. Gycolan Yellow GRL.<br>4. (1). | Blue and green. |

*Free dye from the demetalization of the chromium complex.
(1) Geigy Industrial Chemicals, Ardsley, N.Y.
(2) Eastman Kodak Co., Rochester, N.Y.
(3) General Aniline and Film Corp., New York, N.Y.
(4) Allied Chemical Corp., Bala-Cynwyd, Pa.
(5) Verona Dyestuffs, Div. of Verona-Pharma Chemical Corp., Union, N.J.

The following are examples of the manufacture of novel spectrally sensitized electrophotographic materials employing some of the azo dyes listed in Table I.

EXAMPLE I

Three milligrams (0.003 g.) of Erio Chrome Black T Supra (Geigy) (C.I. Mordant Black 11; C. I. 14645 (Dye No. 1 of Table I) are dissolved in 200 ml. of anhydrous methanol. The pH of the dye solution is adjusted to 7 by the addition of sodium acetate and sodium hydroxide solutions. One hundred grams of photoconductive zinc oxide (Azo ZZZ 661, American Zinc Sales Company) is added to the solution and tumbled manually for about 10 minutes. The suspension is separated by filtration and a completely clear supernatant liquid is recovered. This indicated that all the dye is adsorbed, yielding a dye concentration of $3 \times 10^{1165}$ g. of dye/g. ZnO The dyed ZnO is first air-dried and then oven-dried at 100° C. The color of the dyed ZnO is very slightly off white. The dye concentration is 0.003 percent based on the weight of the photoconductor, ZnO. Seventy-five grams of the dyed ZnO is added to a solution containing 25 g. of a resin, Coat Rez6RW37 (a solvent solution of vinyl multipolymers, 50 percent solids, Stein Hall and Company), and 69 ml. of toluene in a Waring Blender to form a coating solution. The coating solution is mixed for 3 minutes and then dip-coated onto the foil side of a paper-aluminum foil laminate (using a pilot size laboratory coater) to form a photoconductive layer. Samples of the photoconductive layer were exposed through Wratten filters (2B, 47B, 58, R25A) to a 100-watt incandescent lamp at a distance of 2 feet. The samples were developed with an electroscopic liquid direct toner. The developed samples indicated that spectral sensitization was achieved at all wavelengths of the visible spectrum except those of the blue, 4,000–5,000 A.

EXAMPLE II

The procedure and quantities described in Example I were used to obtain a predyed photoconductive zinc oxide containing Erio Chrome Brown R Supra (Geigy), C.I. Mordant Brown 33, C.I. 13250 (Dye No. 3 of Table I), as the spectral sensitizing dye. The dye concentration was 0.003 percent based on the weight of the photoconductor, ZnO.

Seventy-five grams of the dyed ZnO was added to a Waring Blender containing 25 g. of the resin, Coat Rez 6RW37 (50 percent solids) (Stein Hall and Company) and 69 ml. of toluene. The suspension was mixed for 3 minutes. It was then coated onto the foil side of a paper-aluminum foil laminate, using a pilot-size laboratory coater.

Samples of the electrophotographic layer formed were exposed through a series of Wratten Filters (2B, 47B, 58, R25A) to a 100-watt incandescent lamp at a distance of 2 feet. The exposed samples wee developed with an electroscopic liquid direct toner. The electrophotographic coatings spectrally sensitized with this dye exhibited sensitization to wavelengths between 5,000 and 6,000 A.

EXAMPLE III

To a solution containing 30 ml. of toluene, 2 ml. methanol, and 9.0 g. of the resin, Coat Rez 6RW37 (50 percent solids) (Stein Hall and Company) was added, 0.010 g. Chrome Fast Orange 3RLA (GAF) C.I. Mordant Orange 4, C.I. 18940 (Dye No. 7 of Table I). The pH of the solution was adjusted to approximately 9 with N-methylcyclohexylamine (Abbott Laboratories), and 30 g. of photoconductive ZnO, Azo ZZZ 661, was added to it. The dye concentration used was 0.03 percent based on the weight of the photoconductor, ZnO. The mixture was mixed in a Waring Blender for 3 minutes and hand-coated onto the foil side of a paper-aluminum foil laminate. The paper was dried and a sample of the photoconductive layer formed was exposed to a 100-watt lamp at a distance of 2 feet through a set of Wratten filters (2B, 47B, 58, R25A). Electroscopic liquid direct toner was used to develop the exposed photoconductive layer. The imaged sample showed that spectral sensitization occurred between 5,000–6,000 A. and extended slightly into the blue, 4,000–5,000 A.

EXAMPLE IV 0.030 g. of the metal-free dyestuff derived by the demetalization (removal of the chromium atom) of Gycolan Yellow GRL 133 percent (Geigy) (C.I. Acid Yellow 99, C.I. 13900) (Dye No. 12 in Table I) was dissolved in 2 ml. of methanol. Thirty ml. of toluene was added to the solution followed by the addition of 11 g. of the resin, Coat REz 6RW37 (50 percent solids) (Stein Hall and Company). The pH of the resinous solution was rendered basic to approximately 9 by the addition of N-methylcyclohexylamine (Abbott Laboratories). Thirty-two grams of photoconductive zinc oxide, Azo ZZZ 661, American Zinc Sales Company, was added and the suspension mixed for 3 hours by end-over-end mechanical agitation. The dye concentration was 0.1 percent based on weight of the photoconductor, zinc oxide. A portion of the suspension was hand coated onto the foil side of a paper-aluminum foil laminate and air and oven dried.

Samples of the electrophotographic layer thus formed were exposed through a series of Wratten filters (2B, 47B, 58, R25A) to a 100-watt incandescent lamp at a distance of 2 feet. The exposed samples were developed with an electroscopic liquid direct toner. The sampled electrophotographic layers (coatings) exhibited a spectral sensitization of the photoconductive zinc oxide to wave-lengths between 3,800 and 5,000 A.

In the above examples of the free (noncomplexed) azo dyes, it is believed that the free azo dyes form metal complexes with the metal of the photoconductor in the photoconductive layers. Thus, it is believed that the o.o'-dihydroxy or o-amino-o'-hydroxy azo dyes of the class listed in Table I form zinc azo dye complexes in the photoconductive layers when the photoconductor is photoconductive zinc oxide and titanium azo dye complexes when the photoconductor is photoconductive titanium dioxide. Also, metal complexes of the azo dyes wherein the complexing metal is the same as that of the photoconductor in the photoconductive layer may be used for light sensitization in place of the free dyes in the aforementioned examples. The preformed or in situ formed azo dye complexes are believed to be adsorbed on the photoconductive surface.

While the quantities of the azo dyes in each of the aforementioned formulations of photoconductive layers is less than 0.5 percent by weight of the weight of the photoconductor, up to about 0.5 percent of the dye by weight to that of the photoconductor may be used for spectral sensitization. Also, the quantities used in the aforementioned examples are not critical and may be varied to produce photoconductive layers with desired characteristics, in a manner known in the art.

What is claimed is:

1. Spectrally sensitized electrophotographic material comprising a photoconductor selected from the group consisting of photoconductive zinc oxide, photoconductive titanium dioxide, and mixtures thereof and an azo dye having as part of its formula the structure

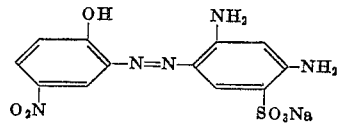

and

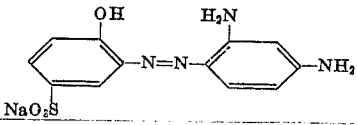

wherein X represents a —$NH_2$ group, and the structure —N=N— is a chromophore connecting two carbon systems at least one of which is aromatic.

2. Spectrally sensitized electrophotographic material as described in claim 1 wherein said photoconductor is photoconductive titanium dioxide and said azo dye is a titanium azo dye complex.

3. Spectrally sensitized electrophotographic material as described in claim 1 wherein said photoconductor is photoconductive zinc oxide and said azo dye is a zinc azo dye complex.

4. A spectrally sensitized electrophotographic recording element comprising a photoconductive layer of zinc oxide in a film-forming binder and up to about 0.5 percent by weight with respect to the weight of said zinc oxide of a zinc azo dye complex of one of the group of azo dyes consisting of

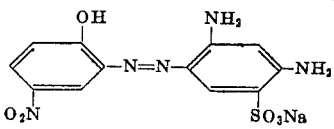

and

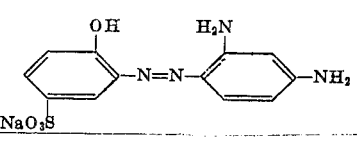

5. Spectrally sensitized light-sensitive material comprising a photoconductor selected from the group consisting of photoconductive zinc oxide and photoconductive titanium dioxide and at least one azo dye selected from the group consisting of

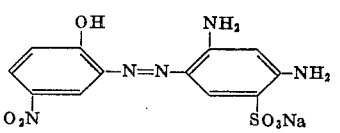

and

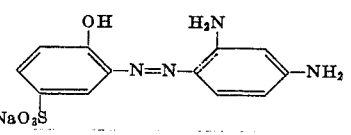

UNITED STATES PATENT OFFICE
CERTIFICATE OF CORRECTION

Patent No. 3,622,341            Dated November 23, 1971

Inventor(s) Wendell Maurice Lee

It is certified that error appears in the above-identified patent and that said Letters Patent are hereby corrected as shown below:

In item [72] on first page, the inventor's first name reading "Wndell" should read --Wendell--

Column 1, line 9, cancel "to" and insert --for--

Column 1, line 49, "-NP=N-" should read -N=N-

Column 1, line 55 should be followed by lines 36-55 in column 2, and line 55 in column 2 should be followed by lines 1-35 in column 2.

Column 5, line 40, "$3 \times 10^{1165}$" should read --$3 \times 10^{-5}$--

Column 6, line 26, cancel "wee" and substitute --were--

Claim 1, cancel the two formulas "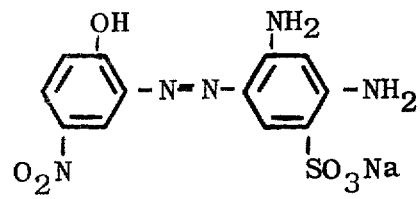

and [structure with OH, H2N, NaO3S, -N=N-, -NH2] " and substitute $-\underset{|}{C}=\underset{|}{C}-N=N-\underset{|}{C}=\underset{|}{C}-$ with OH and X substituents Signed and sealed this 13th day of June 1972.

(SEAL)
Attest:

EDWARD M. FLETCHER, JR.          ROBERT GOTTSCHALK
Attesting Officer                Commissioner of Patents